United States Patent
Hazama et al.

(10) Patent No.: US 11,797,061 B2
(45) Date of Patent: Oct. 24, 2023

(54) PARALLEL BIAXIAL HINGE WITH ROTATION ORDER REGULATING STRUCTURE

(71) Applicant: MITSUBISHI STEEL MFG. CO., LTD., Tokyo (JP)

(72) Inventors: Yuji Hazama, Ichihara (JP); Katsuhito Nishizawa, Ichihara (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 366 days.

(21) Appl. No.: 17/417,170

(22) PCT Filed: Dec. 28, 2018

(86) PCT No.: PCT/JP2018/048538
§ 371 (c)(1),
(2) Date: Jun. 22, 2021

(87) PCT Pub. No.: WO2020/136887
PCT Pub. Date: Jul. 2, 2020

(65) Prior Publication Data
US 2022/0075429 A1    Mar. 10, 2022

(51) Int. Cl.
*G06F 1/16* (2006.01)

(52) U.S. Cl.
CPC .................. *G06F 1/1681* (2013.01)

(58) Field of Classification Search
CPC .... G06F 1/1681; G06F 1/1616; G06F 1/1618; E05D 3/12; E05D 11/087; E05Y 2201/224
See application file for complete search history.

(56) References Cited

U.S. PATENT DOCUMENTS 9,104,381 B2 * 8/2015 Kuramochi ........... G06F 1/1681
10,401,914 B2 * 9/2019 Shang ........................ E05D 5/04
(Continued)

FOREIGN PATENT DOCUMENTS

JP       2007064427    3/2007
JP       2012037049    2/2012
(Continued)

OTHER PUBLICATIONS

International Search Report for International Patent Application No. PCT/JP2018/048538 completed Mar. 20, 2019.

*Primary Examiner* — Sagar Shrestha
(74) *Attorney, Agent, or Firm* — Carlson, Gaskey & Olds, P.C.

(57) ABSTRACT

Provided is a biaxial hinge capable of opening up to 360 degrees in which the hinge does not require a complicated mechanism or components with high machining accuracy. The hinge includes first and second shafts (11, 21), joint plates (34, 37, 38) rotatably coupling first and second shafts (11, 21), regulator (36) movable between a first position and a second position along an axial direction of first and second shaft (11, 21), first lock plate (12) rotating together with the first shaft (11) and inhibiting the rotation of first shaft (11) by engaging with regulator (36) located at the first position, lock sleeve (23) rotating together with second shaft (21) and inhibiting the rotation of second shaft (21) by engaging with regulator (36) located at the second position; and a regulation cam (13) feeding regulator (36) from the second position to the first position.

16 Claims, 15 Drawing Sheets

(56) References Cited

U.S. PATENT DOCUMENTS

| | | | |
|---|---|---|---|
| 11,243,579 B2* | 2/2022 | Liu | E05D 3/18 |
| 11,359,425 B2* | 6/2022 | Chang | G06F 1/1681 |
| 11,555,341 B2* | 1/2023 | Zhou | G06F 1/1616 |
| 2013/0322004 A1* | 12/2013 | Park | E05D 3/122 |
| | | | 16/354 |
| 2021/0081007 A1* | 3/2021 | Jan | G06F 1/1681 |
| 2021/0149454 A1* | 5/2021 | Liu | F16C 11/04 |
| 2021/0240231 A1* | 8/2021 | Ku | H04M 1/022 |

FOREIGN PATENT DOCUMENTS

| | | |
|---|---|---|
| JP | 2012237392 | 12/2012 |
| JP | 2013072442 | 4/2013 |
| JP | 2013100900 | 5/2013 |
| JP | 2013249855 | 12/2013 |
| JP | 2015064105 | 4/2015 |
| JP | 2015105693 | 6/2015 |
| JP | 2015121238 | 7/2015 |
| JP | 2015180833 | 10/2015 |
| JP | 2016038040 | 3/2016 |

\* cited by examiner

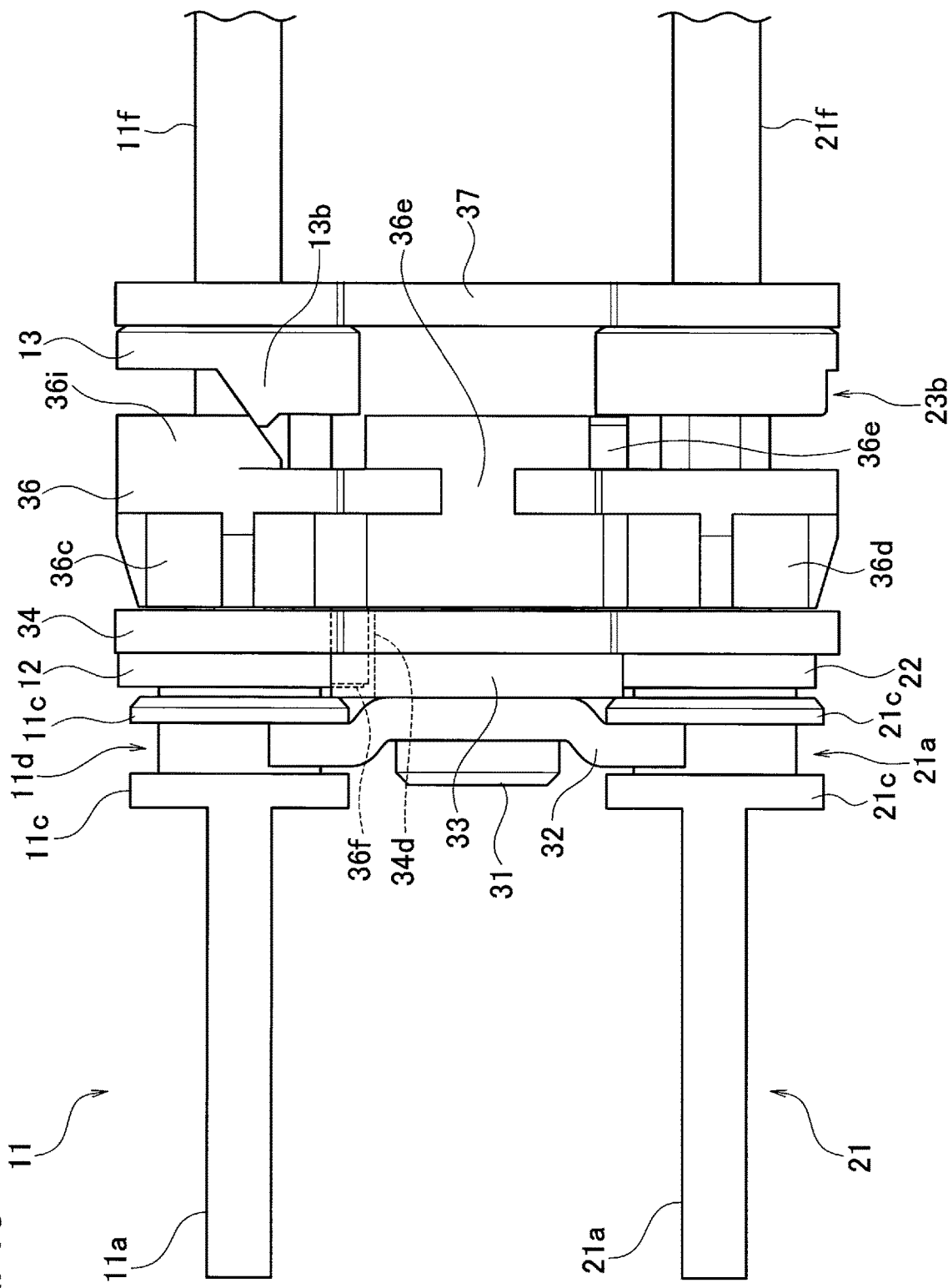

PARALLEL BIAXIAL HINGE WITH ROTATION ORDER REGULATING STRUCTURE

TECHNICAL FIELD

The present embodiment relates to a biaxial hinge that rotatably supports a first member and a second member, and to an electronic device provided with such a hinge.

BACKGROUND ART

Heretofore, like a notebook personal computer and a mobile phone, there has been provided an electronic device composed in such a manner that a first housing provided with input means such as a keyboard and a second housing provided with a display are foldably coupled to each other. In such an electronic device, required is such a function that makes it possible to hold the first housing and the second housing at desired angles in addition to rotatably holding the first housing and the second housing in ranges of predetermined rotation angles. Moreover, in the electronic device, a function that makes it possible to open the first housing and the second housing up to 360 degrees and to close the same therefrom is sometimes required. PTLs 1 to 4 disclose techniques of such a biaxial hinge capable of opening the first housing and the second housing up to 360 degrees and closing the same therefrom.

CITATION LIST

Patent Literature

PTL 1: J P 2015-180833 A
PTL 2: JP 2015-64105 A
PTL 3: JP 2013-249855 A
PTL 4: JP 2015-105693 A

SUMMARY

Technical Problem

In the techniques of the biaxial hinge, which are disclosed in PTLs 1 to 4, a lock member for selectively regulating rotations of a first shaft and second shaft of a hinge is disposed between the first shaft and the second shaft so as to be slidable in a contact/separation direction of the first shaft and the second shaft. Therefore, a dimension of the lock member or the like is limited by an interval between the first shaft and the second shaft, and in order to selectively regulate the rotations of the first shaft and the second shaft by a slid of the lock member, high machining accuracy has been required for components of this hinge, and a complicated mechanism has been necessary therefor.

This embodiment has been proposed in view of the above-mentioned actual circumstances. It is an object of this embodiment to provide a biaxial hinge capable of opening a first housing and a second housing up to 360 degrees and closing the same therefrom, in which the hinge includes components for which high machining accuracy is not required, and does not require a complicated mechanism in order to regulate the rotations of the first shaft and the second shaft, and to provide an electronic device including such a hinge as described above.

Solution to Problem

In order to solve the above-mentioned problem, a hinge according to this application is a hinge capable of supporting a first member and a second member rotatably relative to each other, including: a first shaft having a first attachment portion formed on a base portion thereof for the first member; a second shaft having a second attachment portion formed on a base portion for the second member; coupling means for individually rotatably coupling the first shaft and the second shaft to each other so that the first shaft and the second shaft are parallel to each other at a predetermined distance; a slide member movable between the first position and the second position along an axial direction of the first shaft and the second shaft; first engaging means restrained to the first shaft and rotating together with the first shaft, and for inhibiting the rotation of the first shaft by engaging with the slide member located at the first position; second engaging means restrained to the second shaft and rotating together with the second shaft, and for inhibiting the rotation of the second shaft by engaging with the slide member located at the second position; urging means for urging the slide member from the first position toward the second position; and feeding means for feeding the slide member from the second position to the first position when a rotation angle of the first shaft is in a predetermined range.

The hinge may further include first stopper means for limiting a rotation angle of the first shaft within a predetermined range. The hinge may further include second stopper means for limiting a rotation angle of the second shaft within a predetermined range. The hinge may further include friction generating means for generating friction torques against rotation motions for the first shaft and the second shaft, respectively. The hinge may further include torque generating means for generating torques directed in predetermined directions at rotation angles within predetermined ranges for the first shaft and the second shaft, respectively.

In an electronic device according to this application, the first member and the second member may include a first housing and a second housing, respectively, each housing storing electronic components.

Effects

The hinge according to this embodiment is a biaxial hinge capable of opening the first hinge and the second hinge up to 360 degrees and closing the same therefrom. In the hinge, high machining accuracy is not required for the components thereof, and a complicated mechanism is not required to regulate the rotations of the first shaft and the second shaft, and the hinge has a robust structure. Moreover, an electronic housing according to this embodiment includes the hinge as described above, and can provide convenience that the first housing and the second housing can be opened up to 360 degrees and closed therefrom.

BRIEF DESCRIPTION OF DRAWINGS

FIG. 15 is a side view of the main portion of the hinge of the present embodiment when the opening/closing angle is 360 degrees.

DESCRIPTION OF EMBODIMENTS

Hereinafter, a detailed description will be given of an embodiment of a hinge and an electronic device according to this embodiment with reference to the drawings.

Figure 1:
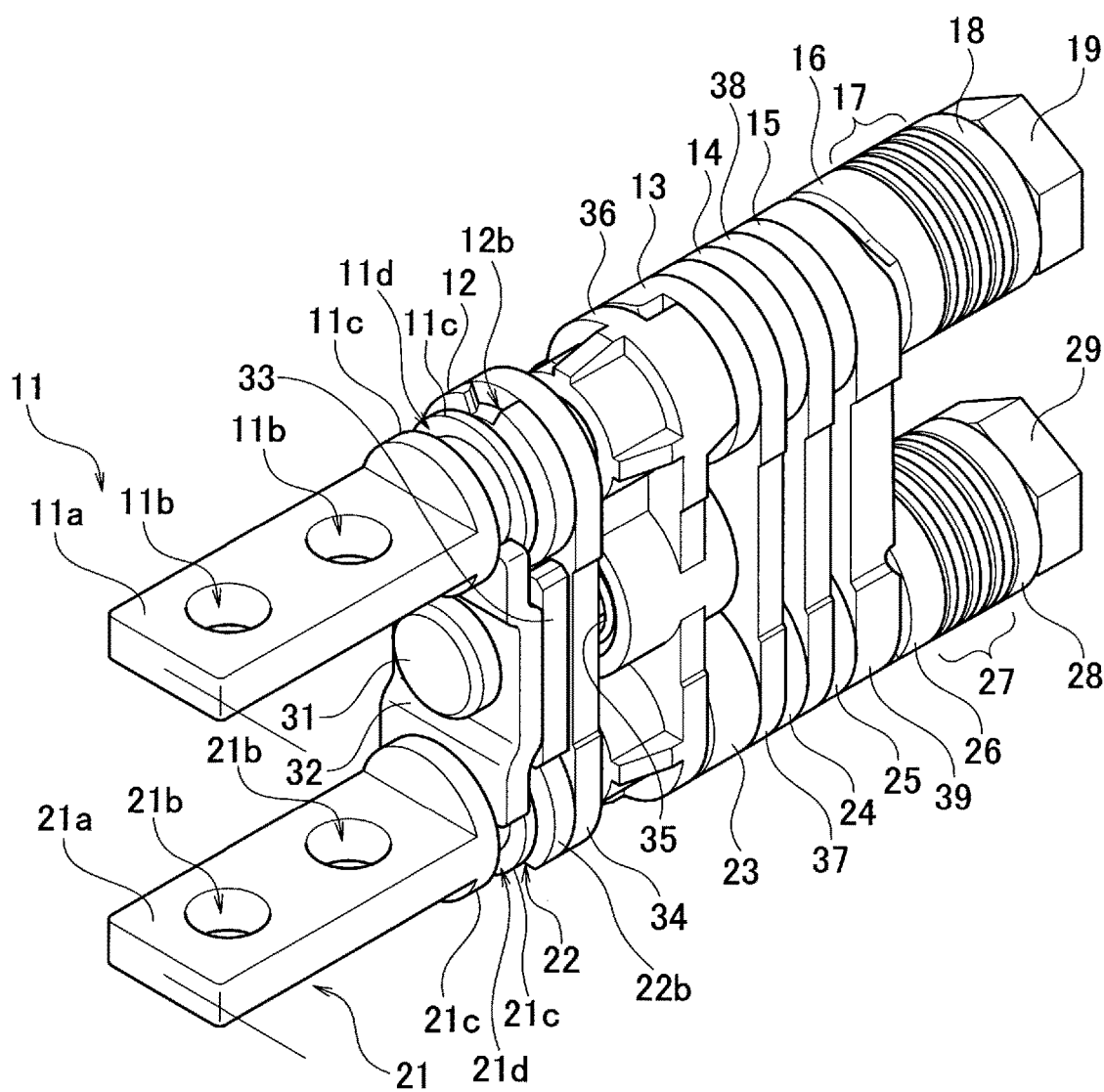
FIG. 1 is a perspective view illustrating a schematic configuration of a hinge of the present embodiment.
Figure 2:
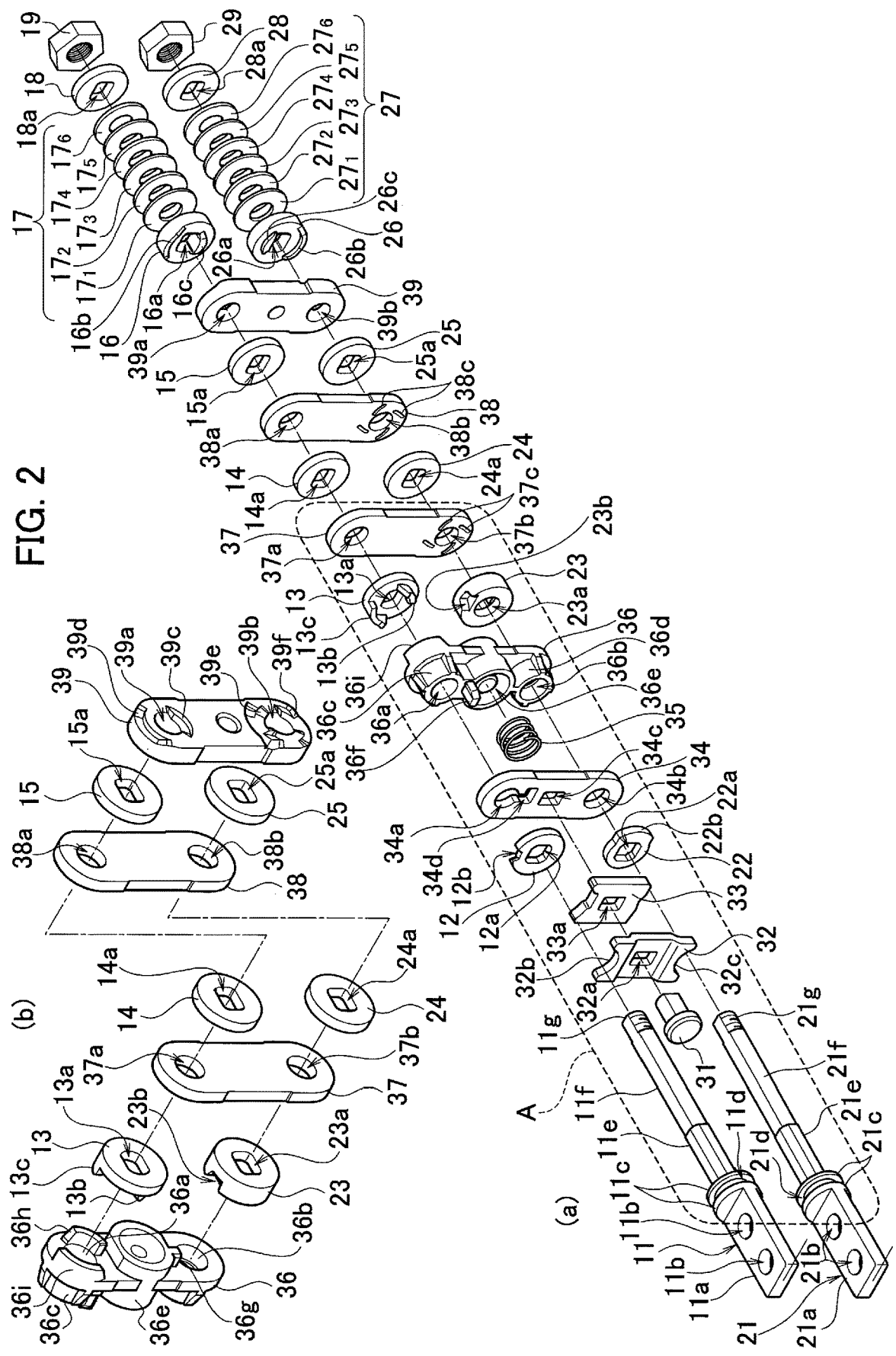
FIG. 2 is exploded perspective views illustrating the schematic configuration of the hinge of the present embodiment.

FIG. 1 is a perspective view illustrating a schematic structure of a hinge of the present embodiment. FIG. 2 is exploded perspective views illustrating the schematic structure of the hinge of the present embodiment. FIG. 2(*a*) is an exploded perspective view viewed from a viewpoint similar to that in FIG. 1, and FIG. 2(*b*) is an exploded perspective view in which a part of the hinge of the present embodiment is viewed from a viewpoint different from that in FIG. 2(*a*).

The hinge of the present embodiment includes a first shaft 11 and a second shaft 21, which compose respective shafts of a biaxial hinge, and coupling means for coupling the first shaft 11 and the second shaft 21 to each other so that the first shaft 11 and the second shaft 21 are individually rotatable while being parallel spaced apart from each other by a predetermined distance.

The first shaft 11 has a plate-shaped attachment portion 11*a* formed on a base portion thereof, the attachment portion receiving attachment of a first member. In an axial direction of the first shaft 11 toward a tip end thereof from the base portion, the first shaft 11 sequentially includes a flange portion 11*c*, a first deformed shaft portion 11*e*, a second deformed shaft portion 11*f* and a threaded portion 11*g*. The plate-shaped attachment portion 11*a* extending in the axial direction has a predetermined width and a predetermined thickness, and has a plurality of through holes 11*b* along the axial direction so as to make it possible to screw the first member thereto. The flange portion 11*c* has a predetermined diameter, and a side surface of the flange portion 11*c* is formed continuously with a side surface of the attachment portion 11*a*. The flange portion 11*e* has a predetermined width in the axial direction, and on a substantial center thereof in the axial direction, a groove portion 11*d* having a predetermined depth is formed with a predetermined width. The first deformed shaft portion 11*e* is formed with a predetermined length continuously with the flange portion 11*c*, and has a shape chamfered into a substantially octagonal prism shape. The second deformed shaft portion 11*f* is formed with a predetermined length continuously with the first deformed shaft portion 11*e*, and has a substantially columnar shape chamfered to a predetermined depth from up and down while interposing the axis therebetween. The threaded portion 11*g* is formed with a predetermined length continuously with the second deformed shaft portion 11*f*, and is threaded into a substantially columnar chamfered shape formed continuously with the second deformed shaft portion 11*f*.

Likewise, the second shaft 21 has a plate-shaped attachment portion 21*a* formed on a base portion thereof, the attachment portion receiving attachment of a second member. In an axial direction of the second shaft 21 toward a tip end thereof from the base portion, the second shaft 21 sequentially includes a flange portion 21*c*, a first deformed shaft portion 21*e*, a second deformed shaft portion 21*f* and a threaded portion 21*g*. The plate-shaped attachment portion 21*a* extending in the axial direction has a predetermined width and a predetermined thickness, and has a plurality of through holes 21*b* along the axial direction so as to make it possible to screw the second member thereto. The flange portion 21*c* has a predetermined diameter, and a side surface of the attachment portion 21*a* is formed continuously with a side surface of the flange portion 21*c*. The flange portion 21*c* has a predetermined width in the axial direction, and on a substantial center thereof in the axial direction, a groove portion 21*d* having a predetermined depth is formed with a predetermined width. The first deformed shaft portion 21*e* is formed with a predetermined length continuously with the flange portion 21*c*, and has a shape chamfered into a substantially octagonal prism shape. The second deformed shaft portion 21*f* is formed with a predetermined length continuously with the first deformed shaft portion 21*e*, and has a substantially columnar shape chamfered to a predetermined depth from up and down while interposing the axis therebetween. The threaded portion 21*g* is formed with a predetermined length continuously with the second deformed shaft portion 21*f*, and is threaded into a substantially columnar chamfered shape formed continuously with the second deformed shaft portion 11*f*.

The coupling means is composed of a first joint plate 34, a second joint plate 37 and a-third joint plate 38. The first joint plate 34, the second joint plate 37 and the third joint plate 38 respectively have first shaft holes 34*a*, 37*a* and 38*a* and respectively have second shaft holes 34*b*, 37*b* and 38*b*. Each of the first shaft holes 34*a*, 37*a* and 38*a* and each of the second shaft holes 34*b*, 37*b* and 38*b* are formed in a plate having a predetermined thickness so as to be spaced apart from each other by a predetermined distance. The first shaft 11 and the second shaft 21 are respectively inserted rotatably into the first shaft holes 34*a* 37*a* and 38*a* and the second shaft holes 34*b*, 37*b* and 38*b*. Moreover, a joint cam 39 also allows rotatable insertion of the first shaft 11 and the second shaft 21 respectively into a first shaft hole 39*a* and a second shaft hole 39*b*, which are formed in a plate having a predetermined thickness so as to be spaced apart from each other by a predetermined distance, and also plays a role of the coupling means like the first joint plate 34, the second joint plate 37 and the third joint plate 38.

A first lock plate 12 and a second lock plate 22 are respectively disposed between the flange portion 11*c* of the first shaft 11 and the first joint plate 34 and between the flange portion 21c of the second shaft 21 and the first joint plate 34. The first lock plate 12 and the second lock plate 22 respectively allow insertion of the first shaft 11 and the second shaft 21 into shaft holes 12a and 22a at substantial centers of plates, each of which has a predetermined thickness and a substantially predetermined diameter. The shaft holes 12a and 22a of the first lock plate 12 12 and the second lock plate 22 respectively have shapes corresponding to the first deformed shaft portions 11e and 21e of the first shaft 11 and the second shaft, and the first lock plate 12 and the second lock plate 22 are restrained by the first shaft 11 and the second shaft 21 and rotate together therewith.

Between the first joint plate 34 and the second joint plate 37, a regulator 36 and a regulation cam 13 are disposed along the first shaft 11, and the regulator 36 and a lock sleeve 23 are disposed along the second shaft 21. The regulator 36 allows rotatable insertion of the first shaft 11 and the second shaft 21 respectively into a first shaft hole 36a and a second shaft hole 36b, which are formed in a plate having a predetermined thickness so as to be spaced apart from each other by a predetermined distance. In the regulator 36, at a substantial center between the first shaft hole 36a and the second shaft hole 36b, a spring housing portion 36e that houses at least a part of a coil spring 35 therein.

Between the first shaft 11 and the second shaft 21, a center pin 31 is disposed, which penetrates through holes 32a, 33a and 34c in respective centers of a support plate 32, a stopper 33, and further the first joint plate 34. A first support portion 32b and second support portion 32c of the support plate 32 are respectively inserted into the groove portion 11d of the flange portion 11e of the first shaft 11 and the groove portion 21d of the flange portion 21c of the second shaft 21, and rotatably support the first shaft 11 and the second shaft 21. The coil spring 35 is inserted around the center pin 31 between the first joint plate 34 and the regulator 36.

Between the regulator 36 and the second joint plate 37, the regulation cam 13 is disposed along the first shaft 11, and the lock sleeve 23 is disposed along the second shaft 21. The regulation cam 13 and the lock sleeve 23 respectively allow insertion of the first shaft 11 and the second shaft 21 into shaft holes 13a and 23a at substantial centers of plates, each of which has a predetermined thickness and a predetermined diameter. The regulation cam 13 and the lock sleeve 23 have shaft holes 13a and 23a which have shapes respectively corresponding to the second deformed shaft portions 11f and 21f of the first shaft 11 and the second shaft 21, respective allow insertion of the second deformed shaft portions 11f and 21f, and are respectively located in contact with side ends of the first deformed shaft portions 11e and 21e which hinder the insertion. Then, the regulation cam 13 and the lock sleeve 23 are respectively restrained by the first shaft 11 and the second shaft 21 and rotate together therewith. In the second joint plate 37, on a first surface thereof directed to the base portions of the first shaft 11 and the second shaft 21, recesses 37c as grease reservoirs having a predetermined pattern are formed so as to surround the second shaft hole 37b.

Between the second joint plate 37 and the third joint plate 38, torque plates 14 and 24 are respectively disposed along the first shaft 11 and the second shaft 21. The torque plates 14 and 24 respectively allow insertion of the first shaft 11 and the second shaft 21 into shaft holes 14a and 24a at substantial centers of plates, each of which has a predetermined thickness and a substantially predetermined diameter. The shaft holes 14a and 24a of the torque plates 14 and 24 respectively have shapes corresponding to the second deformed shaft portions 11f and 21f of the first shaft 11 and the second shaft, and the torque plates 14 and 24 are respectively restrained by the first shaft 11 and the second shaft 21 and rotate together therewith. On a first surface of the third joint plate 38, recesses 38c as grease reservoirs having a predetermined pattern are formed so as to surround the second shaft hole 38b.

Between the third joint plate 38 and the joint cam 39, torque plates 15 and 25 are respectively disposed along the first shaft 11 and the second shaft 21. The torque plates 15 and 25 respectively allow insertion of the first shaft 11 and the second shaft 21 into shaft holes 15a and 25a at substantial centers of plates, each of which has a predetermined thickness and a predetermined diameter. The shaft holes 15a and 25a of the torque plates 15 and 25 respectively have shapes corresponding to the second deformed shaft portions 11f and 21f of the first shaft 11 and the second shaft, and the torque plates 15 and 25 are respectively restrained by the first shaft 11 and the second shaft 21 and rotate together therewith.

From the joint cam 39 toward the tip end of the first shaft 11, a first slide cam 16, a plurality of disc springs 17, an end plate 18 and a nut 19 are sequentially disposed along the first shaft 11. The first slide cam 16 and the end plate 18 respectively allow insertion of the first shaft 11 into shaft holes 16a and 18a at substantial centers of plates, each of which has a predetermined thickness and a predetermined diameter. The shaft holes 16a and 18a of the first slide cam 16 and the end plate 18 have shapes corresponding to the second deformed shaft portion 11f of the first shaft 11, and the first slide cam 16 and the end plate 18 are restrained by the first shaft 11 and rotate together therewith. The plurality of disc springs 17 are composed of first to sixth disc springs $17_1$ to $17_6$ combined in series with one another. The nut 19 is attached to the threaded portion 11g of the first shaft 11.

Moreover, from the joint cam 39 toward the tip end of the second shaft 21, a second slide cam 26, a plurality of disc springs 27, an end plate 28 and a nut 29 are sequentially disposed along the second shaft 21. The second slide cam 26 and the end plate 28 respectively allow insertion of the second shaft 21 into shaft holes 26a and 28a at substantial centers of plates, each of which has a predetermined thickness and a predetermined diameter. The shaft holes 26a and 28a of the second slide cam 26 and the end plate 28 have shapes corresponding to the second deformed shaft portion 21f of the second shaft 21, and the second slide cam 26 and the end plate 28 are restrained by the second shaft 21 and rotate together therewith. The plurality of disc springs 17 are composed of first to sixth disc springs $27_1$ to $27_6$ combined in series with one another. The nut 29 is attached to the threaded portion 21g of the second shaft 21.

In the hinge of the present embodiment, the regulator 36 composes a slide member movable between a first position and a second position along the axial direction of the first shaft 11 and the second shaft 21. Moreover, the first lock plate 12 composes first engaging means for engaging with the regulator 36 as the slide member located at the first position and inhibiting the rotation of the first shaft 11, and the lock sleeve 23 composes second engaging means for engaging with the regulator 36 located at the second position and inhibiting the rotation of the second shaft 21. In other words, the first position where the regulator 36 engages with the first lock plate 12, and the second position is a position where the regulator 36 engages with the lock sleeve 23.

In the hinge of the present embodiment, the coil spring 35 composes urging means for urging the regulator 36, which composes the slide member, from the first position to the second position, and the regulation cam 13 composes feeding means for feeding the regulator 36, which composes the slide member, from the second position to the first position when a rotation angle of the first shaft 11 is within a predetermined range. For example, the regulation cam 13 can feed the regulator 36 from the second position to the first position when the rotation angle of the first shaft 11 is 180 degrees or more.

In the hinge of the present embodiment, the regulator 36 and the regulation cam 13 compose first stopper means 33 for limiting the rotation angle of the first shaft 11 within a predetermined range, and the stopper 33 and the second lock plate 22 compose second stopper means for limiting the rotation angle of the second shaft 21 within a predetermined range. For example, the regulator 36 and the regulation cam 13 can limit the rotation angle of the first shaft 11 so as to be 0 degree or more. Moreover, the stopper 33 and the second lock plate 22 can limit the rotation angle of the second shaft 21 so as to be 0 degree or more to 180 degrees or less.

Figure 3:
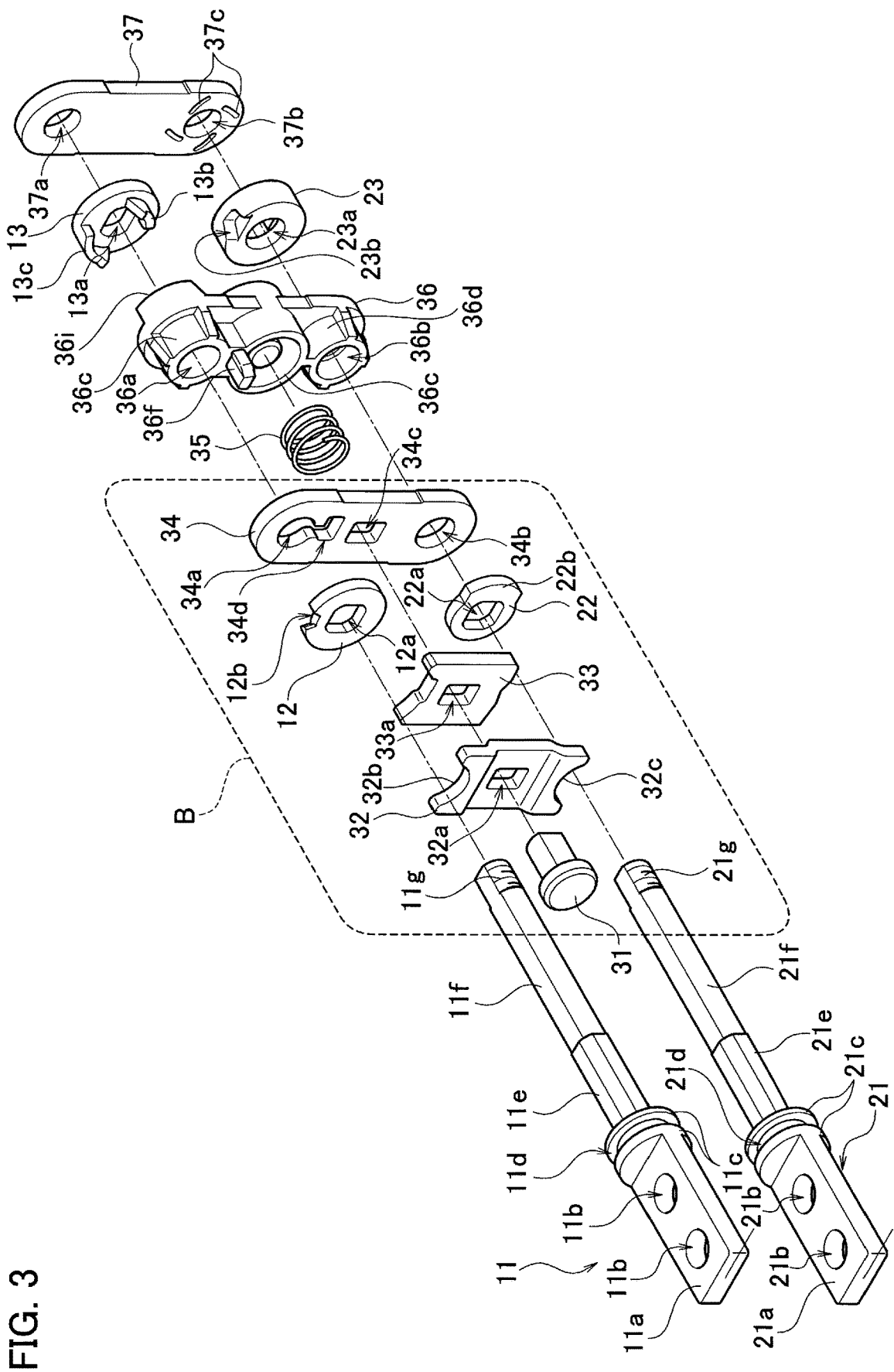
FIG. 3 is an exploded perspective view of a main portion of the hinge of the present embodiment.

FIG. 3 is an exploded perspective view of a main portion, illustrating a configuration A of a part of the hinge of the present embodiment, which is illustrated in FIG. 2. In the hinge of the present embodiment, the configuration A includes the slide member, the first engaging means, the second engaging means, the urging means, the feeding means, the first stopper means and the second stopper means. The configuration A illustrates portions which regulate the rotation angles of the first shaft 11 and the second shaft in conjunction with one another with regard to the opening/closing angle of the hinge.

The regulator 36 that composes the slide member is formed so that the first shaft hole 36a and the second shaft hole 36b, each of which has a predetermined diameter, are spaced apart from each other by a predetermined distance in a plate having a predetermined thickness. In the regulator 36, on a first surface thereof directed to the base portions of the first shaft 11 and the second shaft 21, a first collar 36c and a second collar 36d which respectively surround and extend the first shaft hole 36a and the second shaft hole 36b are formed up to a predetermined height. On the first surface, at a substantial center between the first collar 36c and the second collar 36d, the spring housing portion 36e that houses the coil spring 35 therein is formed up to a predetermined height continuously with the first collar 36c and the second collar 36d. The spring housing portion 36e penetrates a plate of the regulator 36 and is extended to a second surface opposite with the first surface, and is formed up to a predetermined height on the second surface. On the first surface, on a substantial center portion between the first collar 36c and the spring housing portion 36e, a first protrusion 36f with a predetermined height is formed so as to protrude from the first collar 36c and the spring housing portion 36e.

Referring to FIG. 2(b), on the second surface of the regulator 36, at a substantial center between the second shaft hole 36b and the spring housing portion 36e, a second protrusion 36g with a predetermined height is formed continuously with the spring housing portion 36e. On a periphery of the first shaft hole 36a, a pair of protrusions 36h and 36i with a predetermined height, which face each other while interposing the first shaft hole 36a therebetween, are formed.

In the first lock plate 12 that composes the first engaging means, in a plate with a predetermined thickness, which has a substantially predetermined diameter, the shaft hole 12a having a shape corresponding to the first deformed shaft portion 11e of the first shaft 11 is formed at a substantial center thereof, and on a part of an outer periphery thereof, a recess 12b having a predetermined depth in a diameter direction is formed. In the lock sleeve 23 that composes the second engaging means, in a plate having a substantial predetermined diameter and a predetermined thickness, the shaft hole 23a having a shape corresponding to the first deformed shaft portion 21e of the second shaft 21 is formed at a substantial center thereof, and on a part of an outer periphery of a first surface thereof, a recess 23b having predetermined depths in the diameter direction and the axial direction is formed.

The coil spring 35 that composes the urging means always applies urging force between the first joint plate 34 and the regulator 36. Then, with regard to the regulator 36 movable between the first position and the second position along the axial direction of the first shaft 11 and the second shaft 21, the coil spring 35 always urges the regulator 36 from the first position close to the base portions of the first shaft 11 and the second shaft 21 toward the second position close to the tip ends thereof.

On a first surface of the regulation cam 13 that composes the feeding means, a pair of protrusions 13b and 13c having a predetermined height are formed so as to face each other while interposing the shaft hole 13a therebetween. The regulation cam 13 rotates together with the first shaft 11, and in response to the rotation angle, the pair of protrusions 13b and 13c slide so as to face the second surface of the regulator 36 or to face the pair of protrusions 36i and 36j formed on the second surface. Then, when the rotation angle of the first shaft 11 is in a predetermined range, the regulator 36 is fed from the second position to the first position along the axial direction of the first shaft 11 and the second shaft 21 against the urging force of the coil spring 35.

When the regulator 36 is located at the second position close to the tip ends of the first shaft 11 and the second shaft 21, the pair of protrusions 13b and 13c of the regulation cam 13 are in contact with the second surface of the regulator 36 facing the same, and the pair of protrusions 36h and 36i of the regulator 36 are in contact with the first surface of the regulation cam 13 facing the same. At this time, the second protrusion 36g of the regulator 36 engages with the recess 23b of the lock sleeve 23. The rotation of the lock sleeve 23 is inhibited by the regulator 36 that engages therewith, and the rotation of the second shaft 21 that rotates together with the lock sleeve 23 is also inhibited. Note that, at this time, the engagement of the first protrusion 36f of the regulator 36 with the recess 12b of the first lock plate 12 is released.

When the regulator 36 is located at the first position close to the base portions of the first shaft 11 and the second shaft 21, inclined surfaces of the pair of protrusions 13b and 13c of the regulation cam 13 are in contact with inclined surfaces of the protrusions 36i and 36j of the regulator 36, the inclined surfaces facing the inclined surfaces of the pair of protrusions 13b and 13c. At this time, the first protrusion 36f of the regulator 36 passes through a through hole 34d of the first joint plate 34 and engages with the recess 12b of the first lock plate 12. The rotation of the first lock plate 12 is inhibited by the regulator 36 with which the first lock plate 12 engages, and the rotation of the first shaft 11 that rotates together with the first lock plate 12 is also inhibited. Note that, at this time, the engagement of the second protrusion 36g of the regulator 36 with the recess 23b of the lock sleeve 23 is released.

In the regulator 36 and the regulation cam 13, which compose the first stopper means, when the regulator 36 is at the second position close to the tip ends of the first shaft 11 and the second shaft 21, the pair of protrusions 36h and 36i of the second surface of the regulator 36 are in contact with the first surface of the regulation cam 13, which faces the same, and the pair of protrusions 13b and 13e of the first surface of the regulation cam 13 are in contact with the second surface of the regulator 36, which faces the same, then with regard to the pair of protrusions 13b and 13e of the regulation cam 13, the rotation angles thereof in a predetermined direction are limited within predetermined ranges by the pair of protrusions 36h and 36i of the regulator 36, which correspond thereto. The regulation cam 13 rotates together with the first shaft 11, and also with regard to the first shaft 11, a rotation angle thereof within such a predetermined direction is limited within such a predetermined range. For example, with regard to the first shaft 11, the rotation angle thereof may be limited to a smaller angle than 0 degree by the regulator 36 and the regulation cam 13. Note that, when the first shaft 11 is rotated in a direction reverse to the above-described predetermined direction and reaches a predetermined rotation angle, the regulator 36 is fed from the second position to the first position as mentioned above.

In the second lock plate 22 and the stopper 33, which compose the second stopper means, the second lock plate 22 has a protrusion 22b, which has a predetermined height in a circumferential direction, on a part of a circumference with a substantial predetermined diameter. As illustrated in FIG. 1, the second lock plate 22 and the stopper 33 are located on the same plane, and a rotation angle of the protrusion 22b of the second lock plate 22 is limited to a predetermined range by the stopper 33. The second lock plate 22 rotates together with the second shaft 21, and the rotation angle of the second shaft 21 is also limited within a predetermined range. For example, the rotation angle of the second shaft 21 may be limited within a range from 0 degree to 180 degrees by the second lock plate 22 and the stopper 33.

Figure 4:
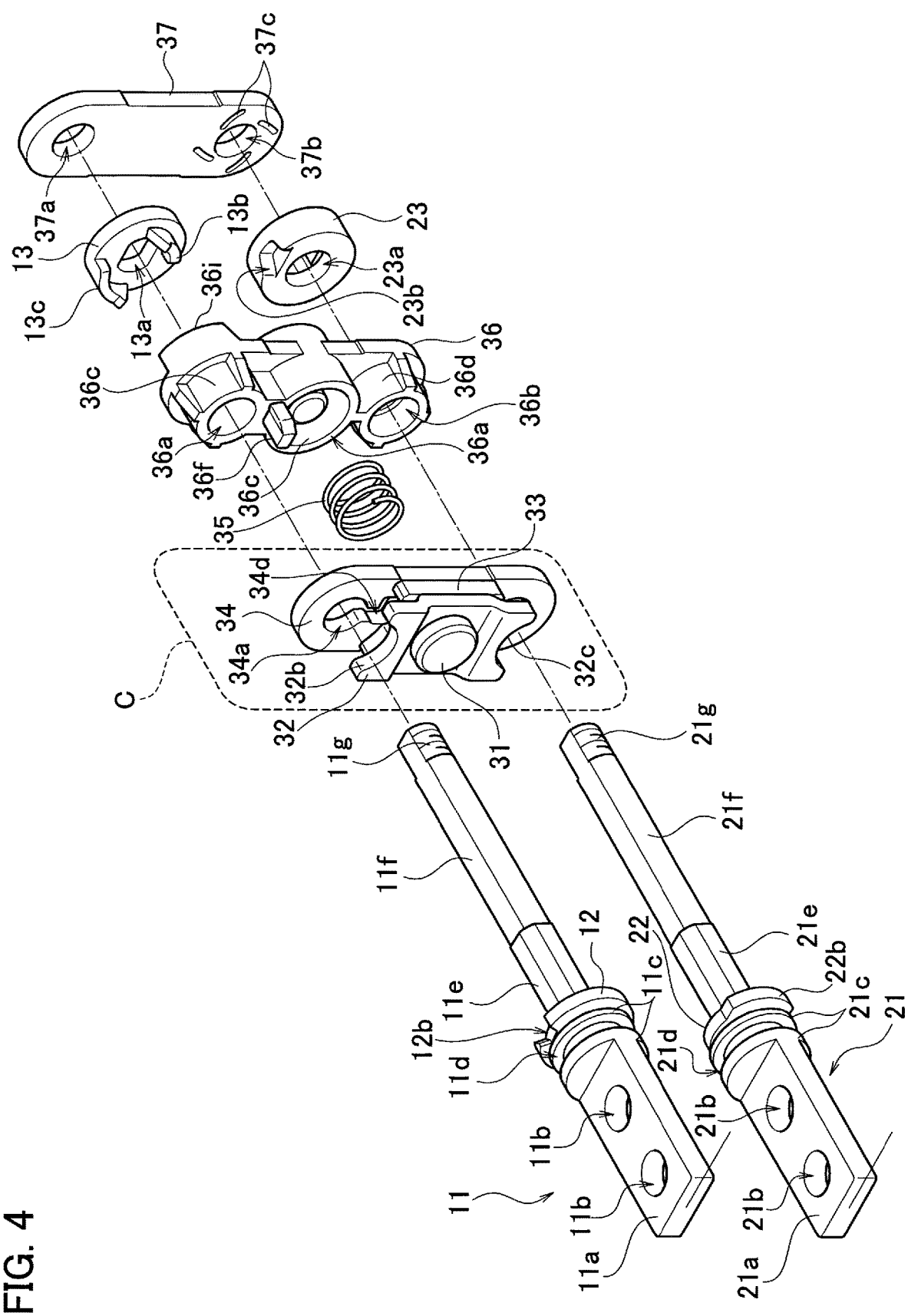
FIG. 4 is an exploded perspective view of a main portion that composes a sub-assembly in FIG. 3.

FIG. 4 is an exploded perspective view illustrating a sub-assembly in the configuration illustrated in FIG. 3. In the present embodiment, a configuration B in FIG. 3 is configured integrally like a sub-assembly C of FIG. 4. From the base portions of the first shaft 11 and the second shaft 21 toward the tip ends thereof in the axial direction, the sub-assembly C includes the center pin 31, the support plate 32, the stopper 33 and the first joint plate 34. The support plate 32, the stopper 33 and the first joint plate 34 are press-fitted to a shaft of the center pin 31 through the respective through holes 32a, 33a and 34c, whereby such an integral configuration is achieved.

Likewise, the first lock plate 12 is also press-fitted into the first deformed shaft portion 11e of the first shaft 11 through the shaft hole 12a, and is disposed adjacent to the flange portion 11c, and whereby the integral configuration is achieved. Moreover, the second lock plate 22 is also press-fitted into the first deformed shaft portion 21e of the second shaft 21 through the shaft hole 22a, and is disposed adjacent to the flange portion 21c, and whereby the integral configuration is achieved.

In the hinge of the present embodiment, the torque plates 14, 15, 24 and 25, the second joint plate 37, the third joint plate 38 and the joint cam 39 compose friction generating means for generating friction torques against rotational motions of the respective first shaft 11 and the second shaft 21. The torque plates 14 and 24 are sandwiched between the second joint plate 37 and the third joint plate 38, the torque plates 15 and 25 are sandwiched between the third joint plate 38 and the joint cam 39, and both thereof are pressed by the urge of the disc springs 17 and 27. Hence, at the time of rotating together with the first shaft 11 or the second shaft 21, the torque plates 14, 15, 24 and 25 generate the friction torques against the rotation. By such friction torques as described above, the hinge of the present embodiment makes it possible to prevent rapid rotation of the hinge and to keep an opening/closing state of the hinge at a predetermined angle.

In the hinge of the present embodiment, the joint cam 39, the first slide cam 16 and the second slide cam 26 compose torque generating means for generating torques, which go in a predetermined direction, individually at rotation angles within predetermined ranges for the first shaft 11 and the second shaft 21. In the joint cam 39, on a second surface thereof directed to the tip ends of the first shaft 11 and the second shaft 21 in the axial direction, there are formed a pair of recesses 39c and 39d which face each other while sandwiching the first shaft hole 39a therebetween and a pair of recesses 39e and 39f which face each other while sandwiching the second shaft hole 39b. In the first slide cam 16, on a first surface thereof directed to the base portion of the first shaft 11, a pair of protrusions 16b and 16c which face each other while sandwiching the shaft hole 16a therebetween are formed so as to correspond to the pair of recesses 39c and 39d of the second surface of the joint cam 39. Moreover, in the second slide cam 26, on a first surface thereof directed to the base portion of the second shaft 21, a pair of protrusions 26b and 26c which face each other while sandwiching the shaft hole 26a therebetween are formed so as to correspond to the pair of recesses 39e and 39f of the second surface of the joint cam 39.

When the joint cam 39 and the first slide cam 16 are pressed against each other by the urge of the disc springs 17, the first slide cam 16 rotates together with the first shaft 11, and the pair of protrusions 16b and 16c on the first surface of the first slide cam 16 enter the pair of recesses 39c and 39d on the second surface of the joint cam 39, then the joint cam 39 and the first slide cam 16 generate torque so as to draw the first shaft 11 into a direction of the rotation. Likewise, when the joint cam 39 and the second slide cam 26 are pressed against each other by the urge of the disc springs 27, the second slide cam 26 rotates together with the second shaft 21, and the pair of protrusions 16b and 16c on the first surface of the second slide cam 26 enter the pair of recesses 39c and 39d on the second surface of the joint cam 39, then the joint cam 39 and the second slide cam 26 generate torque so as to draw the second shaft 21 into a direction of the rotation. The hinge of the present embodiment generates such torque to draw each of the shafts into a predetermined rotation angle within a range of the predetermined rotation angle, thereby providing convenience to a user who opens and closes the hinge. For example, when the hinge is closed toward 0 degree as an opening/closing angle or is opened toward 180 degrees as an opening/closing angle, such torque to draw the shaft to the angle can be generated.

Figure 5:
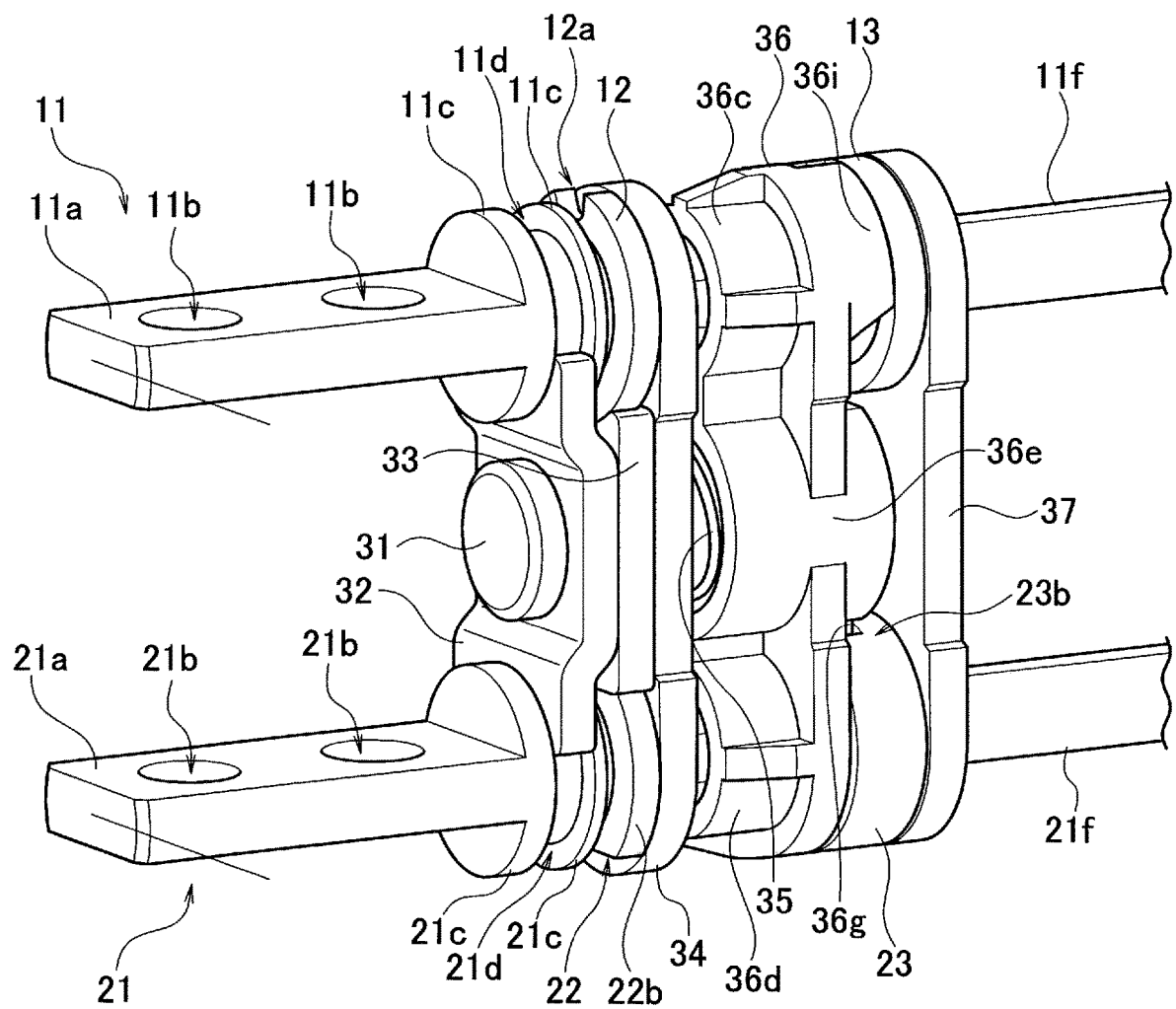
FIG. 5 is a perspective view of the main portion of the hinge of the present embodiment when an opening/closing angle is 0 degree.
Figure 6:
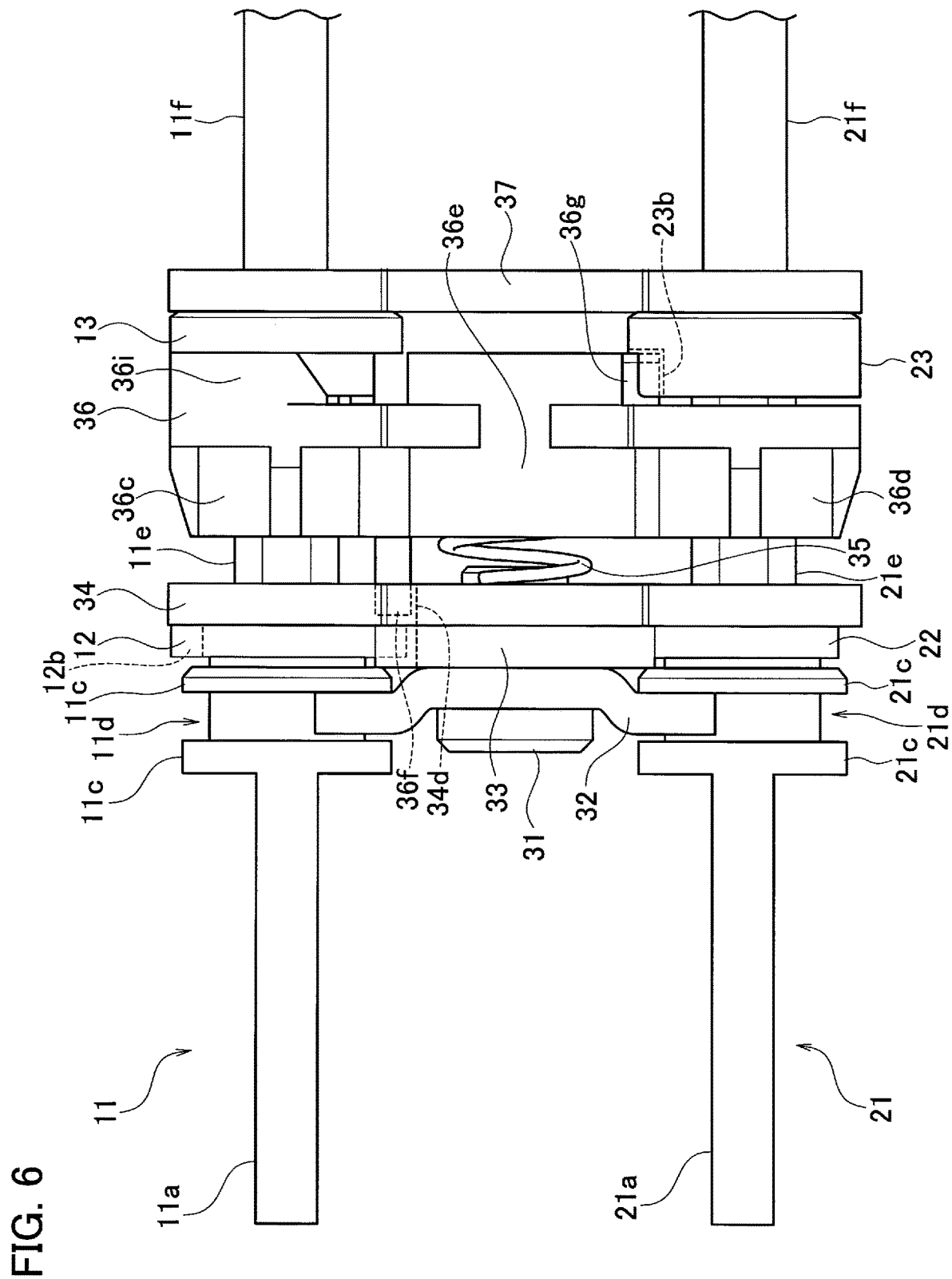
FIG. 6 is a side view of the main portion of the hinge of the present embodiment when the opening/closing angle is 0 degree.

FIG. 5 is a perspective view of the main portion, illustrating the hinge of the present embodiment when the opening/closing angle is 0 degree. FIG. 6 is a side view of the main portion, illustrating the hinge of the present embodiment when the opening/closing angle is 0 degree. In the present embodiment, extending directions of the first member and the second member which are respectively attached to the attachment portions 11a and 21a of the base portions of the first shaft 11 and the second shaft 21 are defined as angles of the first shaft 11 and the second shaft 21, and as illustrated in FIG. 5, these angles are represented by segments on end surfaces of the base portions. Then, as illustrated in FIG. 5, rotation angles of the first shaft 11 and the second shaft 21 when the first member and the second member, which are to be attached to the first shaft 11 and the second shaft 21, are closed and parallel to each other are individually defined as 0 degree, and the opening/closing angle of the hinge at that time is defined as 0 degree.

Figure 7:
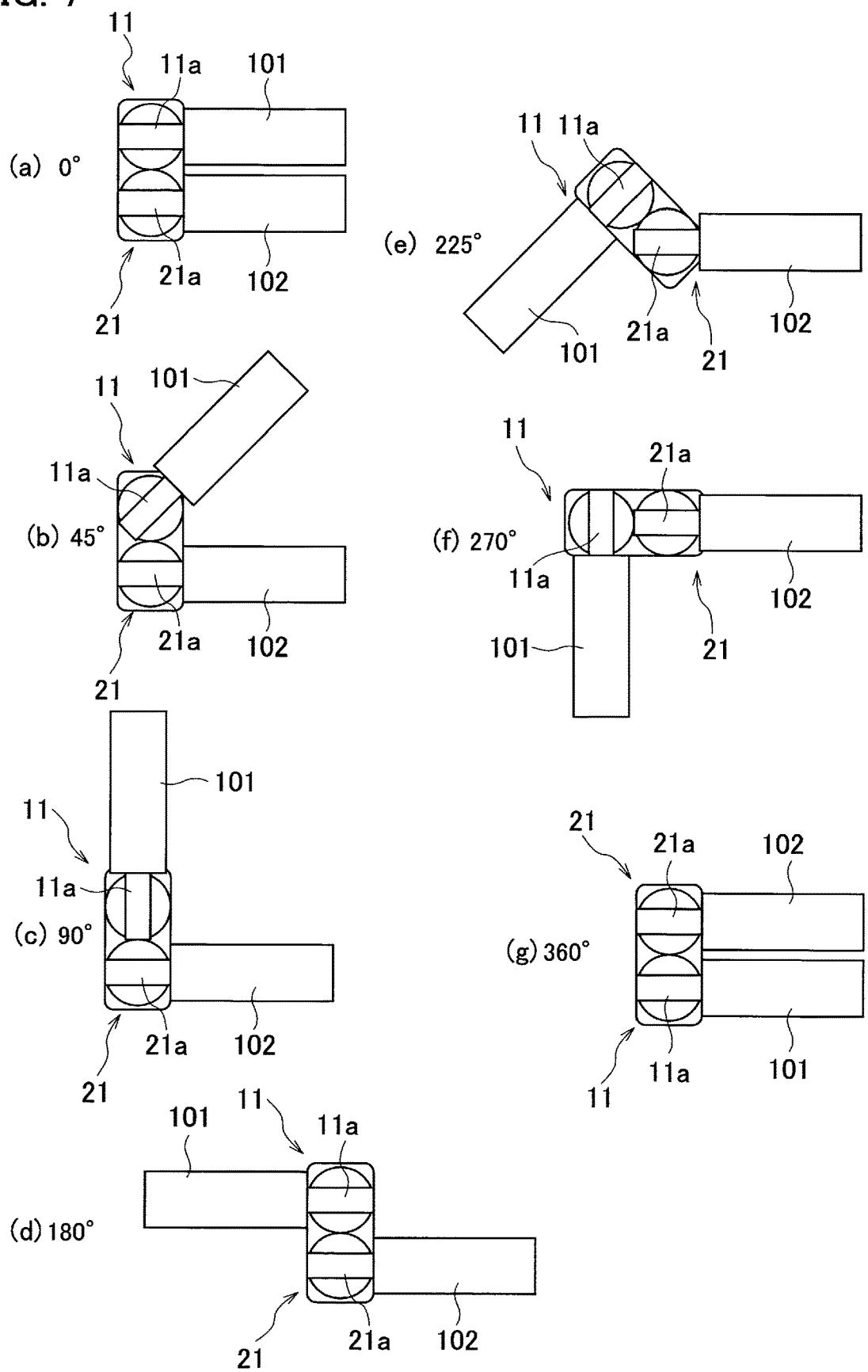
FIG. 7 is schematic views explaining opening/closing operations of the hinge of the present embodiment.

FIG. 7 is front views schematically illustrating modes when the hinge of the present embodiment has a variety of opening/closing angles. Such a case where the opening/closing angle is 0 degree as illustrated in FIG. 5 and FIG. 6 corresponds to FIG. 7(a).

As illustrated in FIG. 5 and FIG. 6, when the opening/closing angle of the hinge is 0 degree, the rotation angles of the first shaft 11 and the second shaft 21 are also 0 degree. The regulator 36 is located at the second position close to the tip end sides in the axial direction of the first shaft 11 and the second shaft 21, and the second protrusion 36g on the second surface of the regulator 36 engages with the recess 23b of the lock sleeve 23. The rotation of the second shaft 21 that rotates together with the lock sleeve 23 is inhibited since the lock sleeve 23 engages with the regulator 36. Meanwhile, the first protrusion 36f on the first surface of the regulator 36 does not engage with the recess 12b of the first lock plate 12. The first shaft 11 that rotates together with the first lock plate 12 is rotatable since the first lock plate 12 does not engage with the regulator 36.

At this time, end surfaces of the pair of protrusions 13b and 13c of the regulation cam 13 abut against end surfaces of the pair of protrusions 36h and 36i of the regulator 36, and the rotation of the regulation cam 13 in a predetermined direction is inhibited. The regulation cam 13 rotates together with the first shaft 11, and rotation of the first shaft, which is less than 0 degree, is inhibited. Moreover, the protrusion 22b of the second lock plate 22 abuts against the stopper 33, and the rotation of the second lock plate 22 in a predetermined direction is inhibited. The second lock plate 22 rotates together with the second shaft 21, and the rotation of the second shaft 21, which is less than 0 degree, is inhibited.

Note that, in the case of gradually closing the hinge so that the opening/closing angle of the hinge gradually approaches 0 degree, the toque can be generated by the above-mentioned torque means so that the shaft is drawn into the direction where the hinge is closed toward 0 degree as the opening/closing angle. By such torque as described above, it becomes possible to easily achieve a state where the hinge is completely closed, and a burden on the user who opens and closes the hinge can be reduced.

FIG. 7(a) illustrates the case where the opening/closing angle and of the hinge is 0 degree, and likewise, FIG. 7(b) illustrates the case where the opening/closing angle of the hinge is 45 degrees, and FIG. 7(c) illustrates the case where the opening/closing angle of the hinge is 90 degrees. Also in these cases, only the first shaft 11 rotates, and the second shaft 21 does not rotate.

Figure 8:
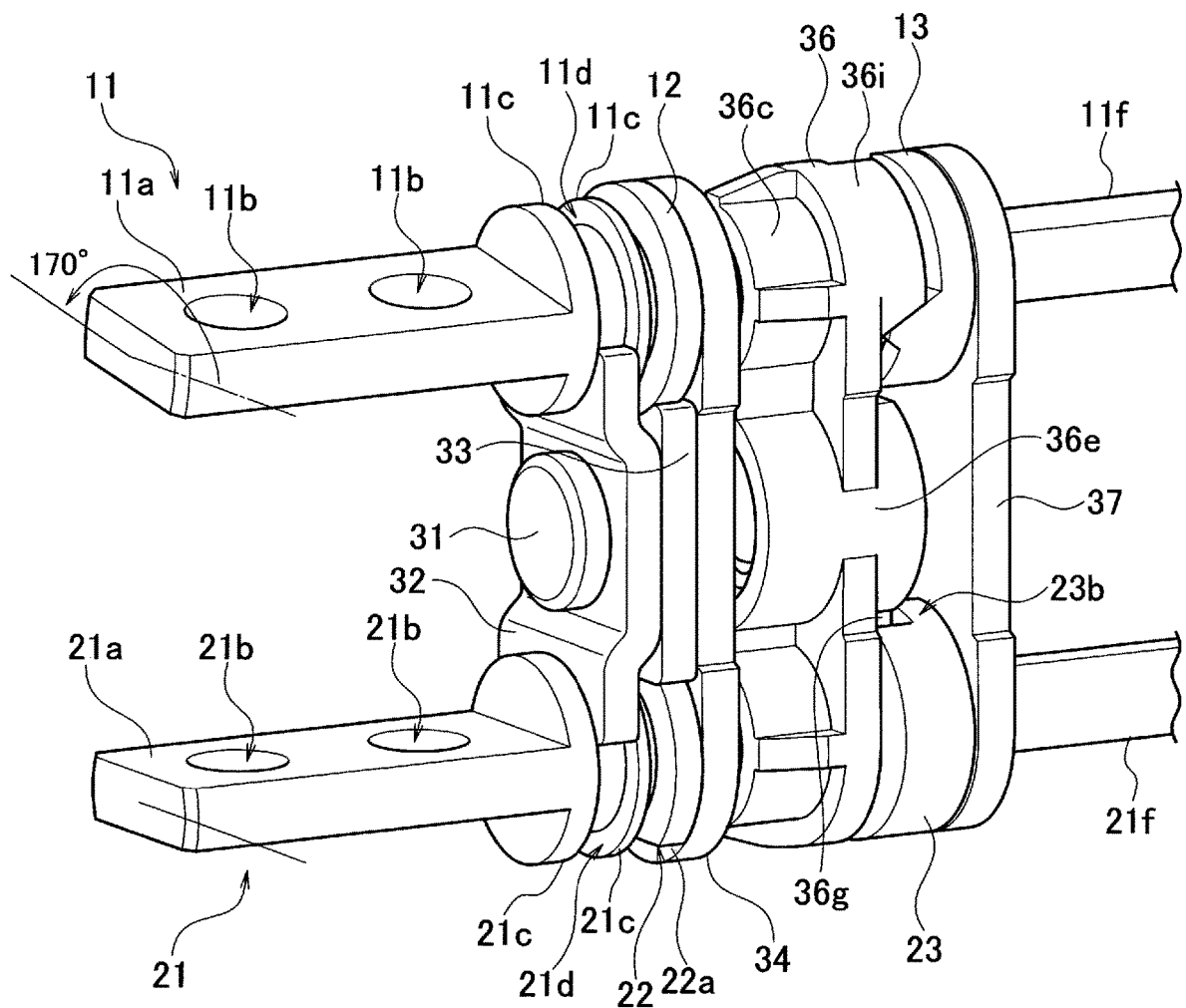
FIG. 8 is a perspective view of the main portion of the hinge of the present embodiment when the opening/closing angle is 170 degrees.
Figure 9:
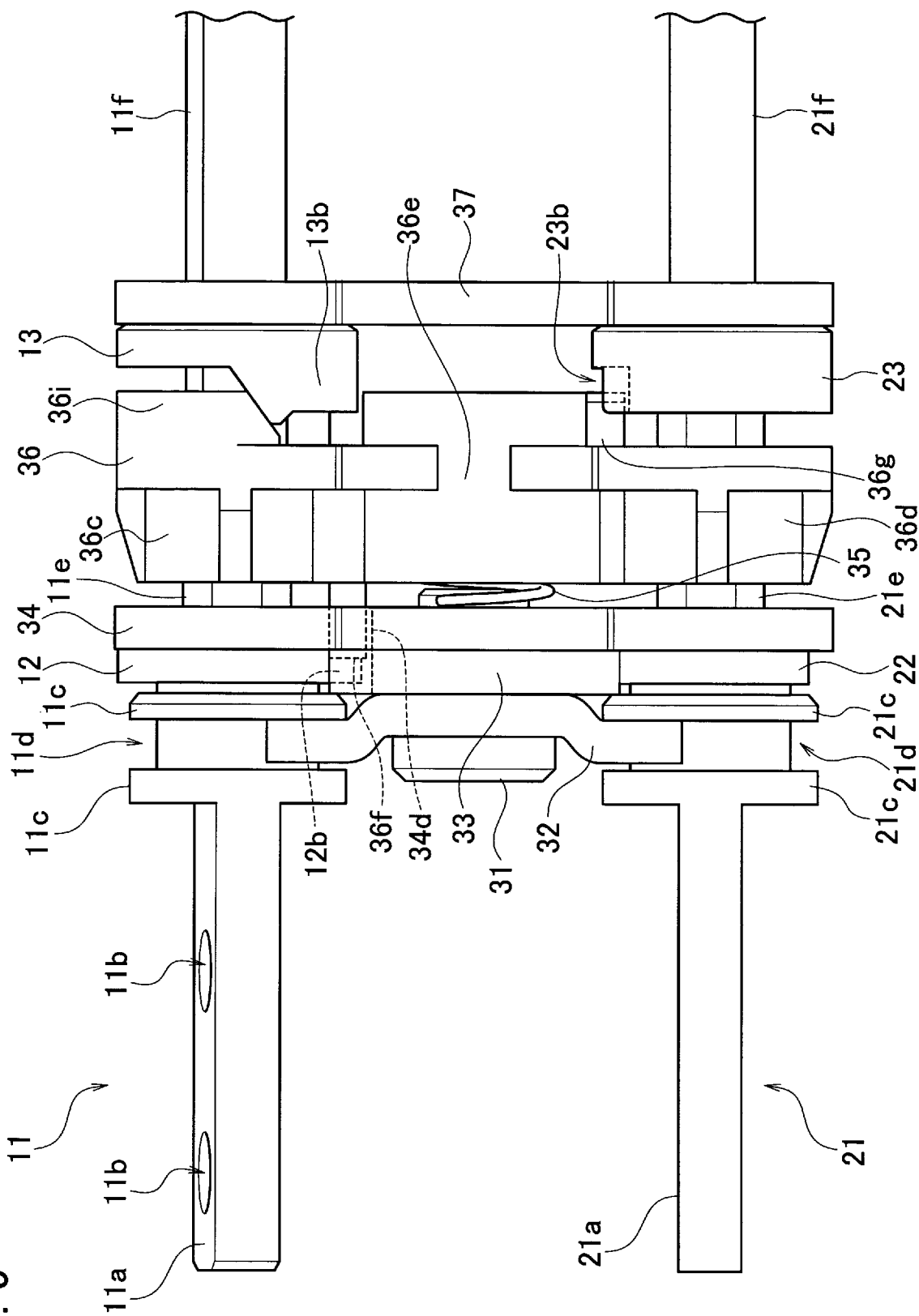
FIG. 9 is a side view of the main portion of the hinge of the present embodiment when the opening/closing angle is 170 degrees.

FIG. 8 is a perspective view of the main portion in the hinge of the present embodiment when the opening/closing angle is 170 degrees. FIG. 9 is a side view of the main portion in the hinge of the present embodiment when the opening/closing angle is 170 degrees. When the opening/closing angle of the hinge is 170 degrees, the rotation angle of the first shaft 11 is 170 degrees, and meanwhile, the rotation angle of the second shaft 21 is 0 degree.

When the opening/closing angle of the hinge is 170 degrees, the regulator 36 is fed by a predetermined distance from the second position toward the first position by the regulation cam 13 that rotates together with the first shaft 11. The inclined surfaces of the pair of protrusions 13b and 13c formed on the first surface of the regulation cam 13 slide by being brought into contact with the inclined surfaces of the pair of protrusions 36h and 36i formed on the second surface of the regulator 36 in response to the rotation of the regulation cam 13 that rotates together with the first shaft 11, and feeds the regulator 36 by a predetermined distance from the second position toward the first position. At this time, the regulator 36 is still located at such a position close to the second position, and the second protrusion 36g on the second surface of the regulator 36 engages with the recess 23b of the lock sleeve 23. The rotation of the second shaft 21 that rotates together with the lock sleeve 23 is inhibited since the lock sleeve 23 engages with the regulator 36. Meanwhile, the first protrusion 36f on the first surface of the regulator 36 does not engage with the recess 12b of the first lock plate 12, either. The first shaft 11 that rotates together with the first lock plate 12 is rotatable since the first lock plate 12 does not engage with the regulator 36.

Figure 10:
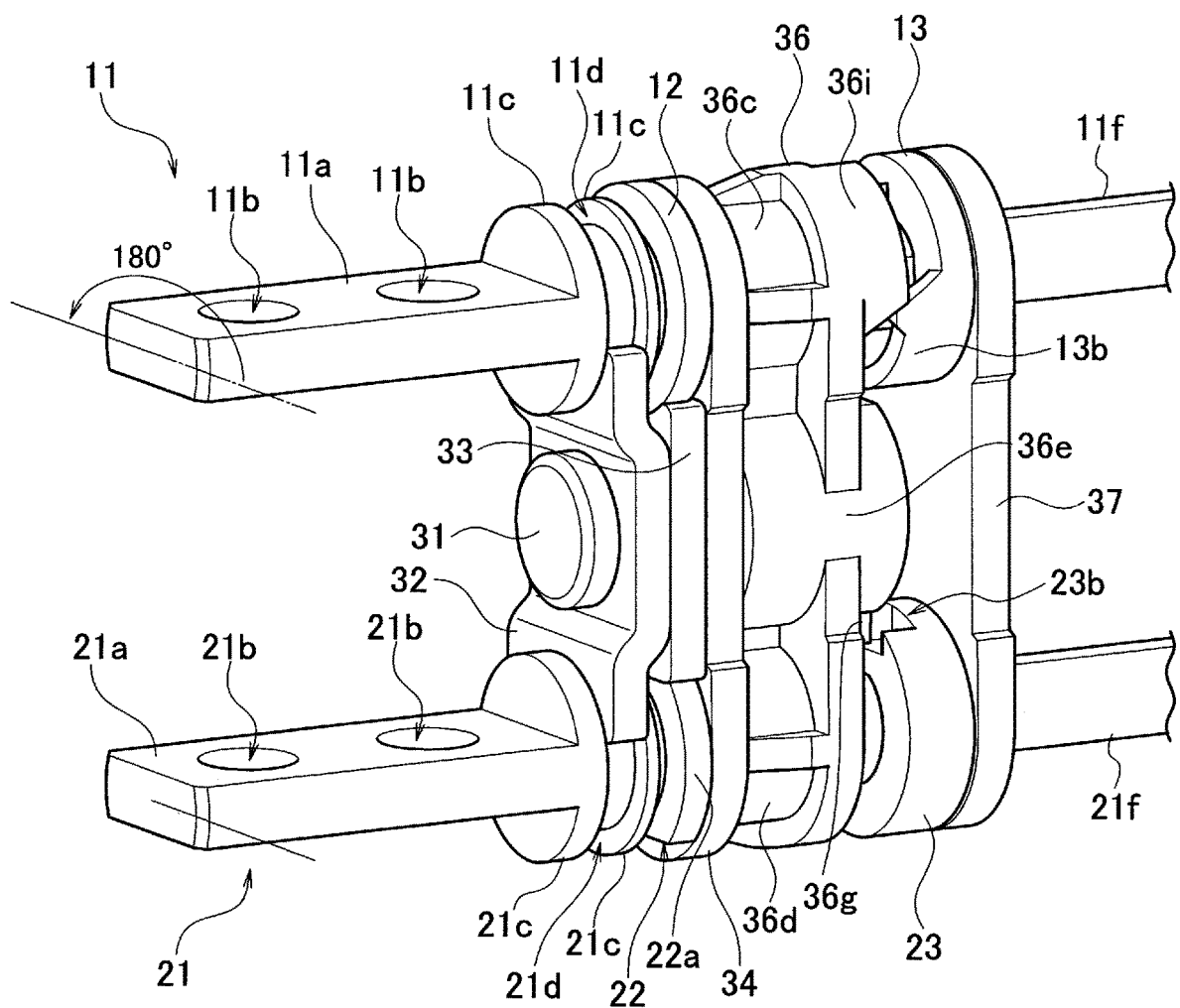
FIG. 10 is a perspective view of the main portion of the hinge of the present embodiment when the opening/closing angle is 180 degrees.
Figure 11:
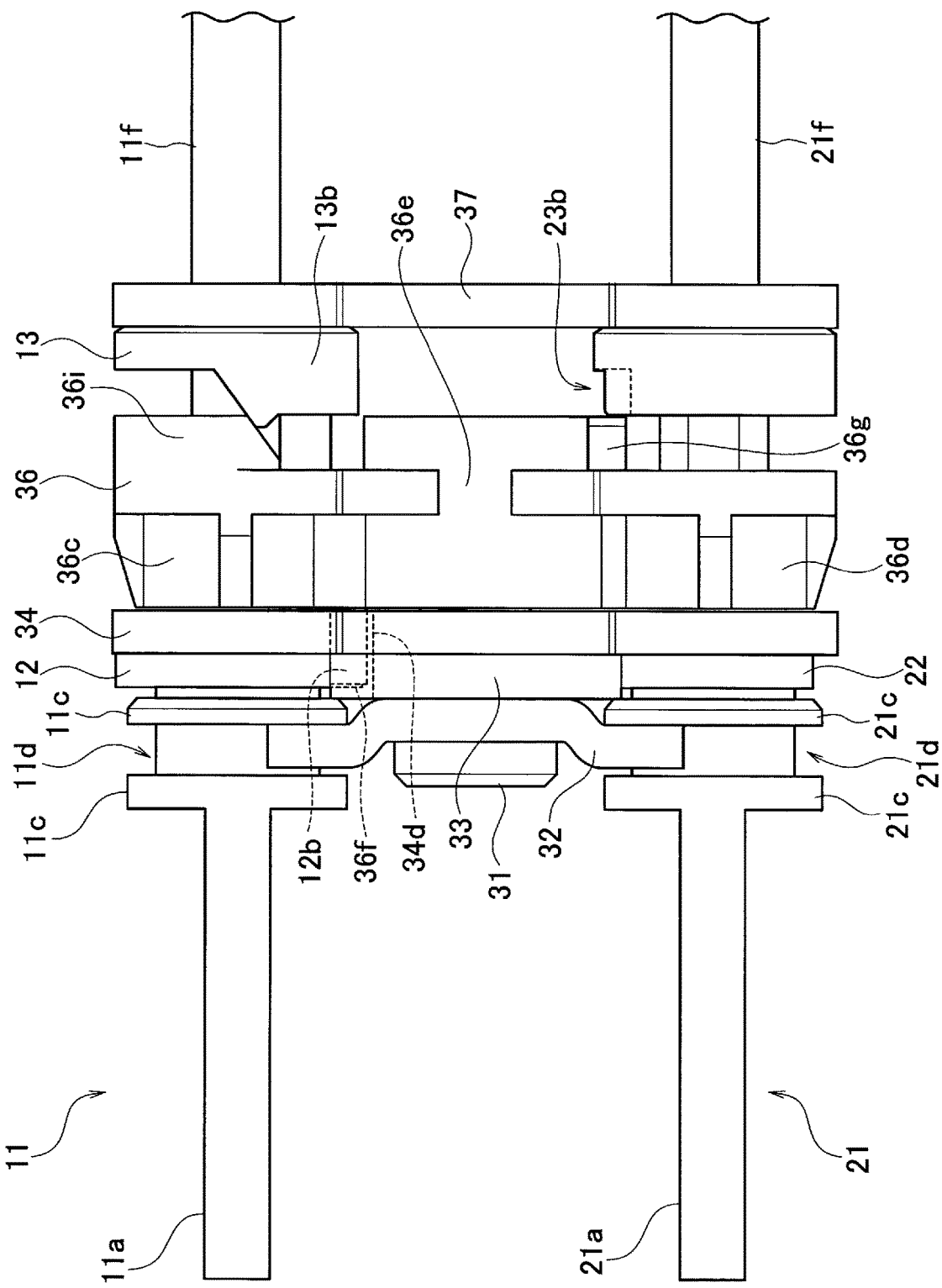
FIG. 11 is a side view of the main portion of the hinge of the present embodiment when the opening/closing angle is 180 degrees.

FIG. 10 is a perspective view of the main portion in the hinge of the present embodiment when the rotation angle is 180 degrees. FIG. 11 is a side view of the main portion in the hinge of the present embodiment when the rotation angle is 180 degrees. When the rotation angle of the hinge is 180 degrees, the rotation angle of the first shaft 11 is 180 degrees, and meanwhile, the rotation angle of the second shaft 21 is 0 degree.

When the rotation angle of the hinge is 180 degrees, the regulator 36 is fed from the second position to the first position by the regulation cam 13 that rotates together with the first shaft 11. The inclined surfaces of the pair of protrusions 13b and 13c formed on the first surface of the regulation cam 13 slide by being brought into contact with the inclined surfaces of the pair of protrusions 36h and 36i formed on the second surface of the regulator 36 in response to the rotation of the regulation cam 13 that rotates together with the first shaft 11, and feeds the regulator 36 by a predetermined distance until the regulator 36 reaches the first position from the second position. At this time, the first protrusion 36f on the first surface of the regulator 36 engages with the recess 12b of the first lock plate 12. The rotation of the first shaft 11 that rotates together with the first lock plate 12 is inhibited since the first lock plate 12 engages with the regulator 36. Meanwhile, the engagement of the second protrusion 36g on the second surface of the regulator 36 with the recess 23b of the lock sleeve 23 is released. The second shaft 21 that rotates together with the lock sleeve 23 is rotatable since the lock sleeve 23 does not engage with the regulator 36. FIG. 7(d) illustrates the case where the opening/closing angle is 180 degrees in the hinge of the present embodiment, and likewise, FIG. 7(e) illustrates the case where the opening/closing angle is 225 degrees therein, FIG. 7(f) illustrates the case where the opening/closing angle is 270 degrees therein, and FIG. 7(g) illustrates the case where the opening/closing angle is 360 degrees. Also in the case where the opening/closing angle exceeds 180 degrees, only the second shaft 21 rotates, and the first shaft 11 does not rotates.

Note that, in the case of opening and closing the first shaft 11 and the second shaft 21 so that the opening/closing angle of the hinge gradually approaches 180 degrees, the torque can be generated by the above-mentioned torque means so that the shaft is drawn into the direction where the hinge is opened or closed toward 180 degrees as the opening/closing angle. By such torque as described above, it becomes possible to easily achieve a state where the hinge is opened flat where the opening/closing angle thereof is 180 degrees, and the burden on the user who opens and closes the hinge can be reduced.

Figure 12:
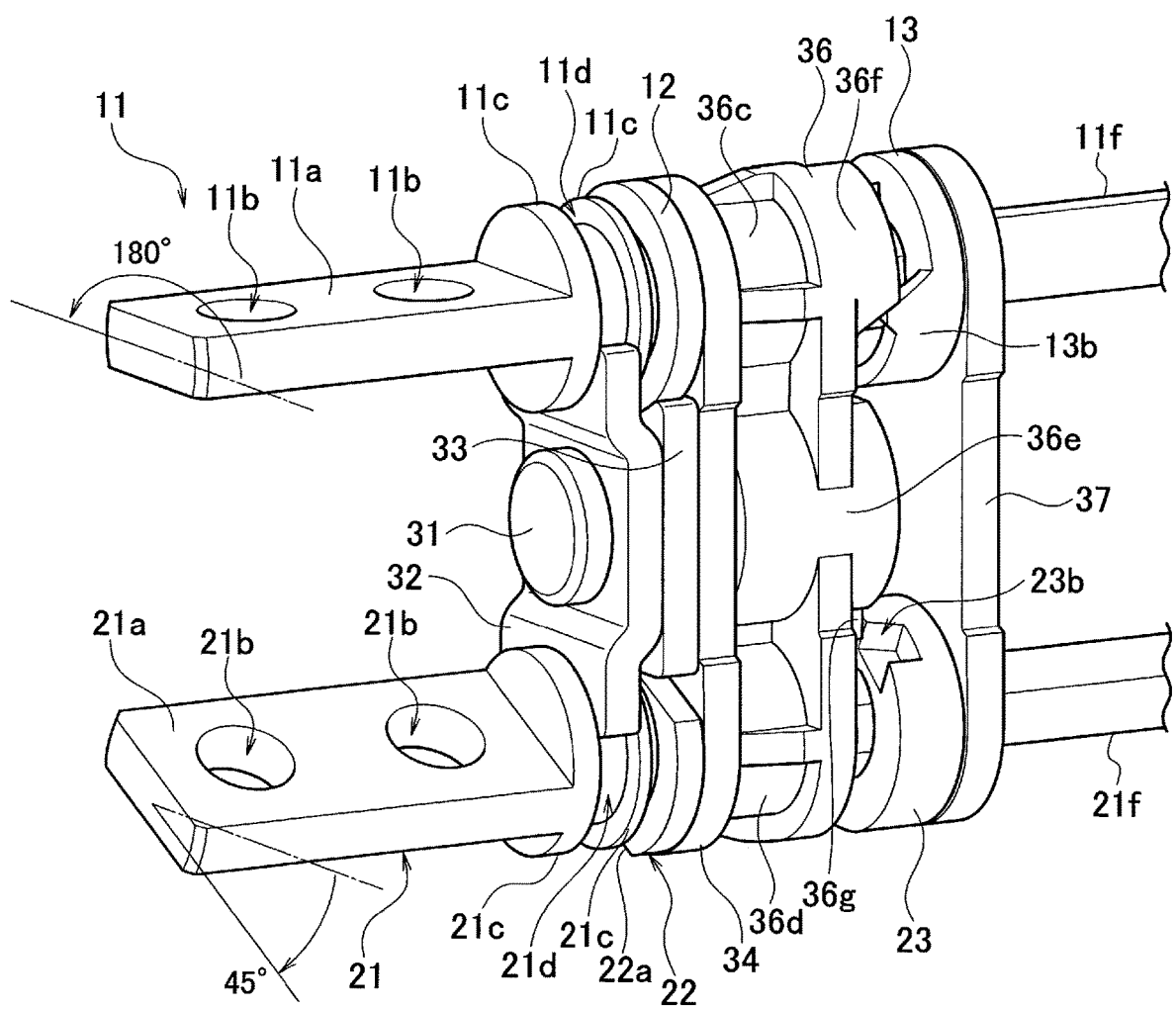
FIG. 12 is a perspective view of the main portion of the hinge of the present embodiment when the opening/closing angle is 225 degrees.
Figure 13:
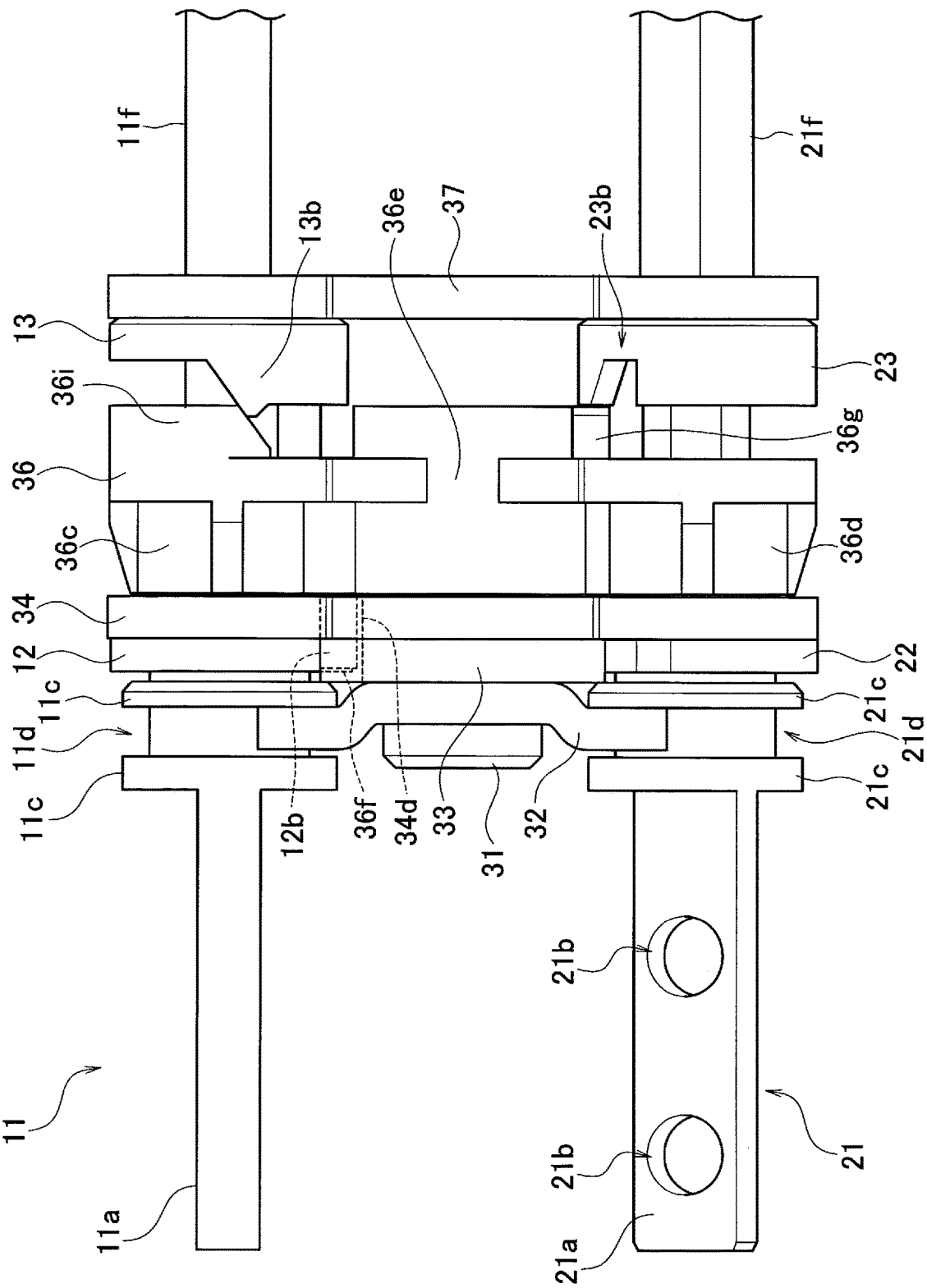
FIG. 13 is a side view of the main portion of the hinge of the present embodiment when the opening/closing angle is 225 degrees.

FIG. 12 is a perspective view of the main portion in the hinge of the present embodiment when the opening/closing angle is 225 degrees. FIG. 13 is a side view of the main portion in the hinge of the present embodiment when the opening/closing angle is 225 degrees. When the opening/closing angle of the hinge is 225 degrees, the rotation angle of the first shaft 11 is 180 degrees, and the rotation angle of the second shaft 21 is 45 degrees. This corresponds to the case of FIG. 7(*e*).

When the opening/closing angle of the hinge is 225 degrees, the regulator 36 is fed from the second position to the first position by the regulation cam 13 that rotates together with the first shaft 11. The first protrusion 36*f* on the first surface of the regulator 36 engages with the recess 12*b* of the first lock plate 12. The rotation of the first shaft 11 that rotates together with the first lock plate 12 is inhibited since the first lock plate 12 engages with the regulator 36. Meanwhile, the engagement of the second protrusion 36*g* on the second surface of the regulator 36 with the recess 23*b* of the lock sleeve 23 is released. The second shaft 21 that rotates together with the lock sleeve 23 is rotatable since the lock sleeve 23 does not engage with the regulator 36.

Figure 14:
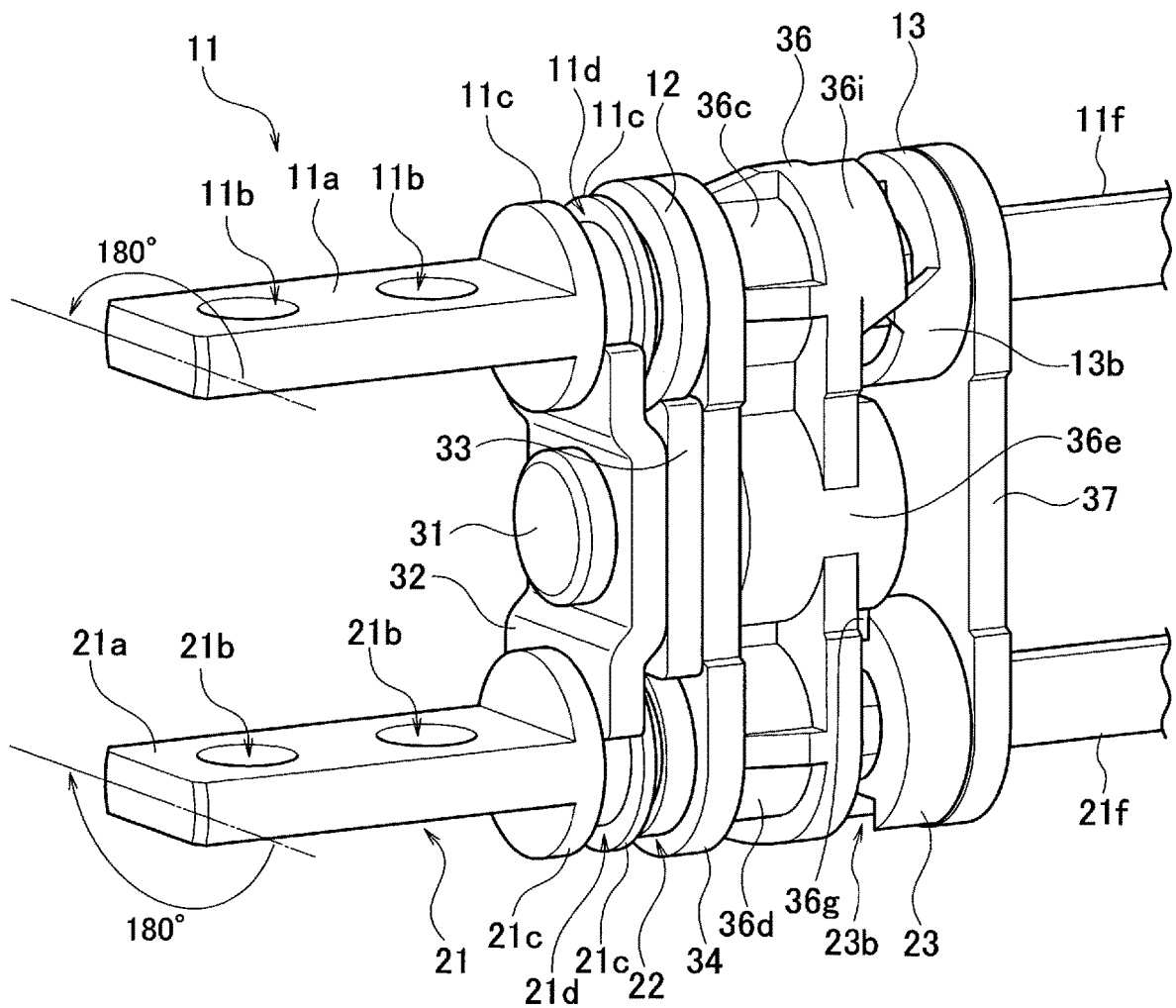
FIG. 14 is a perspective view of the main portion of the hinge of the present embodiment when the opening/closing angle is 360 degrees.

FIG. 14 is a perspective view of the main portion in the hinge of the present embodiment when the opening/closing angle is 360 degrees. FIG. 15 is a side view of the main portion in the hinge of the present embodiment when the opening/closing angle is 360 degrees. When the opening/closing angle of the hinge is 360 degrees, the rotation angle of the first shaft 11 is 180 degrees, and the rotation angle of the second shaft 21 is 180 degrees. This corresponds to the case of FIG. 7(*g*).

When the opening/closing angle of the hinge is 360 degrees, the regulator 36 is fed from the second position to the first position by the regulation cam 13 that rotates together with the first shaft 11. The first protrusion 36*f* on the first surface of the regulator 36 engages with the recess 12*b* of the first lock plate 12. The rotation of the first shaft 11 that rotates together with the first lock plate 12 is inhibited since the first lock plate 12 engages with the regulator 36. Meanwhile, the engagement of the second protrusion 36*g* on the second surface of the regulator 36 with the recess 23*b* of the lock sleeve 23 is released. The second shaft 21 that rotates together with the lock sleeve 23 is rotatable since the lock sleeve 23 does not engage with the regulator 36. At this time, the protrusion 22*b* of the second lock plate 22 abuts against the stopper 33, and the rotation of the second lock plate 22 is inhibited. The second lock plate 22 is rotated together with the second shaft 21, and the rotation of the second shaft 21, which exceeds 180 degree, is inhibited.

As described above, the hinge of the present embodiment is a biaxial hinge and individually prescribes the rotation angles of the first shaft 11 and the second shaft in accordance with the opening/closing angle as illustrated in FIG. 7 by: the regulator 36 movable between the first and second positions along the axial direction of the first shaft 11 and the second shaft 21; the first lock plate 12 that engages with the regulator 36 as the slide member located at the first position and inhibits the rotation of the first shaft 11; the lock sleeve 23 that engages with the regulator 36 as the slide member located at the second position and inhibits the rotation of the second shaft 21; the coil spring 35 that urges the regulator 36 from the first position toward the second position; and the regulation cam 13 that feeds the regulator 36 from the second position to the first position when the rotation angle of the first shaft 11 is within a predetermined range. Moreover, the rotation angles of the first shaft 11 and the second shaft are prescribed within predetermined ranges by: the regulator 36 and the regulation cam 13, which limit the rotation angle of the first shaft 11 within a predetermined range; and the stopper 33 and the second lock plate 22, which limit the rotation angle of the second shaft 21 within a predetermined range.

The hinge of the present embodiment prescribes the operations of the first shaft 11 and the second shaft 21 by motions of the regulator 36, which follow the rotation of the first shaft 11 and go along the axial direction of the first shaft 11 and the second shaft 21. It is sufficient if the regulator 36 moves in the axial direction and engages with the first lock plate 12 or the lock sleeve 23. Accordingly, high machining accuracy is not required for the components such as the regulator 36, and a complicated mechanism is not necessary for the engagement. A small number of the components for achieving these operations is also sufficient, and the regulator 36 is robust in terms of structure. Note that the first position and the second position, to which the regulator 36 moves, just need to be those going along the axial direction of the first shaft 11 and the second shaft 21. On the contrary to the disposition in the present embodiment, the first position may be close to the tip ends and the second position may be close to the base portion.

The hinge of the present embodiment can be applied to an electronic device such as a notebook personal computer and a mobile phone, which foldably couples a first housing provided with input means such as a keyboard and a second housing provided with a display or the like to each other. The electronic device of the present embodiment provides the opening/closing angle from 0 degree to 360 degrees to the first housing and the second housing, which respectively house an electronic component and an electronic circuit, and provides convenience to a mode of use of the electronic component. Moreover, the torque to draw the shaft, for example, toward 0 degree or 180 degrees as the opening/closing angle, is generated, whereby convenience can be provided to a user who opens and closes the first housing and the second housing. Moreover, the torque against the opening/closing rotation operation is generated, whereby such convenience as holding a predetermined rotation angle and preventing a sudden rotation operation can be provided.

LIST OF REFERENCE SYMBOLS

11 First shaft
12 First lock plate
13 Regulation cam
14, 15 Torque plate
16 First slide cam
17 Disc spring
18 End plate
19 Nut
21 Second shaft
22 Second lock plate
23 Lock sleeve
24, 25 Torque plate
26 Second slide cam
27 Disc spring
28 End plate
29 Nut
31 Center pin
32 Support plate
33 Stopper
34 First joint plate
35 Coil spring
36 Regulator
37 Second joint plate 38 Third joint plate
39 Joint cam

The invention claimed is:

1. A hinge capable of supporting a first member and a second member rotatably relative to each other, comprising:
  a first shaft having a first attachment portion formed on a first base portion thereof for the first member;
  a second shaft having a second attachment portion formed on a second base portion thereof for the second member;
  coupling means for individually rotatably coupling the first shaft and the second shaft to each other so that the first shaft and the second shaft are parallel to each other at a predetermined distance;
  a slide member movable between a first position and a second position along an axial direction of the first shaft and the second shaft;
  first engaging means restrained to the first shaft and rotating together with the first shaft, and for inhibiting the rotation of the first shaft by engaging with the slide member located at the first position;
  second engaging means restrained to the second shaft and rotating together with the second shaft, and for inhibiting the rotation of the second shaft by engaging with the slide member located at the second position;
  urging means for urging the slide member from the first position toward the second position; and
  feeding means for feeding the slide member from the second position to the first position when a rotation angle of the first shaft is in a first redetermined range.

2. The hinge according to claim 1, further comprising a first stopper means for limiting a rotation angle of the first shaft within the first predetermined range.

3. The hinge according to claim 2, further comprising second stopper means for limiting a rotation angle of the second shaft within a second predetermined range.

4. The hinge according to claim 2, further comprising friction generating means for generating friction torques against rotation motions for the first shaft and the second shaft, respectively.

5. The hinge according to claim 2, further comprising torque generating means for generating torques directed in predetermined directions at rotation angles within the first predetermined range for the first shaft and a second predetermined range for the second shaft.

6. An electronic device comprising the hinge according to claim 2, wherein the first member and the second member comprise a first housing and a second housing, respectively, each housing storing electronic components.

7. The hinge according to claim 1, further comprising second stopper means for limiting a rotation angle of the second shaft within a second predetermined range.

8. The hinge according to claim 7, further comprising friction generating means for generating friction torques against rotation motions for the first shaft and the second shaft, respectively.

9. The hinge according to claim 7, further comprising torque generating means for generating torques directed in predetermined directions at rotation angles within the first predetermined range for the first shaft and within the second predetermined range for the second shaft.

10. An electronic device comprising the hinge according to claim 7, wherein the first member and the second member comprise a first housing and a second housing, respectively, each housing storing electronic components.

11. The hinge according to claim 1, further comprising friction generating means for generating friction torques against rotation motions for the first shaft and the second shaft, respectively.

12. The hinge according to claim 11, further comprising torque generating means for generating torques directed in predetermined directions at rotation angles within the first predetermined range for the first shaft and a second predetermined range for the second shaft.

13. An electronic device comprising the hinge according to claim 11, wherein the first member and the second member comprise a first housing and a second housing, respectively, each housing storing electronic components.

14. The hinge according to claim 1, further comprising torque generating means for generating torques directed in predetermined directions at rotation angles within the first predetermined range for the first shaft and within a second predetermined range for the second shaft.

15. An electronic device comprising the hinge according to claim 14, wherein the first member and the second member comprise a first housing and a second housing, respectively, each housing storing electronic components.

16. An electronic device comprising the hinge according to claim 1, wherein the first member and the second member comprise a first housing, and a second housing, respectively, each housing storing electronic components.

* * * * *